United States Patent
Mueller et al.

(10) Patent No.: US 6,650,658 B1
(45) Date of Patent: Nov. 18, 2003

(54) CONTROLLED ALIASING TO SIMPLIFY SERVICE SELECTION

(75) Inventors: A. Joseph Mueller, San Diego, CA (US); Richard G. C. Williams, San Diego, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/288,066

(22) Filed: Apr. 7, 1999

Related U.S. Application Data

(60) Provisional application No. 60/080,995, filed on Apr. 7, 1998.

(51) Int. Cl.[7] .................. H04L 5/04; H04L 12/26; H04J 3/14; H04J 7/02; H04B 1/66
(52) U.S. Cl. .................. 370/480; 370/204; 370/252; 370/499; 375/222; 375/240
(58) Field of Search ................ 370/204, 210, 370/252, 292, 395, 436, 449, 478, 485, 489, 525; 375/219, 222, 260, 295, 316, 377; 709/233, 251

(56) References Cited

U.S. PATENT DOCUMENTS

| | | | | | |
|---|---|---|---|---|---|
| 4,037,248 A | * | 7/1977 | Iijima et al. | ............... | 375/240 |
| 4,140,972 A | | 2/1979 | Fletcher et al. | ............... | 325/58 |
| 4,349,704 A | * | 9/1982 | Gillis | ............... | 327/106 |
| 5,353,280 A | * | 10/1994 | Ungerbock | ............... | 370/252 |
| 5,491,531 A | | 2/1996 | Adams et al. | ............... | 375/354 |
| 5,533,027 A | | 7/1996 | Akerberg et al. | ............... | 370/195.1 |
| 5,557,612 A | * | 9/1996 | Bingham | ............... | 370/449 |
| 5,812,786 A | * | 9/1998 | Seazholtz et al. | ............... | 709/233 |
| 5,903,612 A | * | 5/1999 | Van Der Putten et al. | .. | 375/316 |
| 5,910,906 A | * | 6/1999 | Scmhmitt | ............... | 364/724 |
| 5,960,036 A | * | 9/1999 | Johnson et al. | ............... | 375/219 |
| 5,995,557 A | * | 11/1999 | Srinivasan | ............... | 375/316 |
| 6,028,891 A | * | 2/2000 | Ribner et al. | ............... | 375/222 |
| 6,058,162 A | * | 5/2000 | Nelson et al. | ............... | 379/27 |
| 6,072,769 A | * | 6/2000 | Ho | ............... | 370/204 |
| 6,088,385 A | * | 7/2000 | Liu | ............... | 375/219 |
| 6,219,378 B1 | * | 4/2001 | Wu | ............... | 375/231 |
| 6,236,675 B1 | * | 5/2001 | Bedinfield et al. | ............... | 375/222 |
| 6,370,187 B1 | * | 4/2002 | Agah | ............... | 375/219 |
| 6,389,062 B1 | * | 5/2002 | Wu | ............... | 375/222 |
| 6,400,759 B1 | * | 6/2002 | Liu et al. | ............... | 375/222 |

* cited by examiner

*Primary Examiner*—Steven Nguyen
*Assistant Examiner*—M. Phan
(74) *Attorney, Agent, or Firm*—McDonnell Boehnen Hulbert & Berghoff

(57) ABSTRACT

A system and method for a handshake protocol for digital subscriber line (DSL) and similar telecommunication systems that makes beneficial use of aliasing to select and decode signaling tones. In particular, the invention carefully selects signaling tones at frequencies such that higher frequency tones would alias down and coincide with specific base tones after sub-sampling. Thus, rather than filtering out higher frequencies to avoid aliasing, aliasing is exploited to use these higher frequencies. This technique would allow a receiver to detect and decode the higher frequency tones at lower frequency tone locations or bands. A related innovation is a band set, which includes one or more tones within a particular frequency band, where typically each tone in a band set corresponds to a different tone set. Exploiting the effects of aliasing eliminates the need to search for compatible spectrum, simplifies receiver design, provides flexibility, scalability and future-proofing, and allows handshaking sessions to be established across mutually exclusive spectrums. The invention is particularly useful for DSL systems, and in particular is well suited for the proposed G.hs standard.

12 Claims, 2 Drawing Sheets

Tones for the 4.3125 kHz Signaling Family

Upstream and Downstream Tones

Constructing Band Sets from Tone Sets

Tones for the 4.3125 kHz Signaling Family

CONTROLLED ALIASING TO SIMPLIFY SERVICE SELECTION

This application claims priority under 35 USC §119(e) to U.S. patent application Ser. No. 60/080,995, filed Apr. 7,1998.

TECHNICAL FIELD

This invention relates to electronic communication systems, and more particularly to a system and method for a handshake signaling protocol for digital subscriber line modems and similar systems.

BACKGROUND

A significant amount of effort has been undertaken to use existing telephone lines for high speed data communications. As part of this effort, a number of Digital Subscriber Line (DSL) systems have been proposed. For example, a version known as Asymmetric Digital Subscriber Line (ADSL) provides a system that applies signals over a single twisted-wire pair that supports "plain old telephone service" (POTS) and high-speed duplex (simultaneous two-way) and simplex (from a network to the customer installation) digital services. Other DSL services are Very high speed DSL (VDSL) and Symmetric High speed DSL (SHDSL). A DSL system essentially encodes high rate digital data as analog signals using special modems. Proposed international standards for ADSL are G.dmt (based on the ANSI T1.413 Issue 2 ADSL Standard (1998)), and G.lite (based on G.dmt but with a lower maximum data rate and simpler implementation). Both of these standards incorporate another proposed international standard, G.hs (for G.handshake), as an essential part of their start-up procedures.

It has been proposed that a common handshake protocol, G.hs, be used for capabilities exchange between all DSL modems defined by the ITU. G.dmt and G.lite are the first examples of this commonality of use. The need for G.hs is to allow different DSL standards to be offered by modem vendors and service providers in such a way that varying applications and operating environments may dictate which DSL standard is chosen to be used on a case by case basis. As such, G.hs must be made simple enough that it may be implemented on a variety of platforms and flexible enough that it can continue to be useful as new DSL modems are specified.

Currently, G.hs is an evolving standard, and is not yet completely specified. However, it is proposed that G.hs will define how modem connections can be initiated, modem capabilities exchanged, and a final modem configuration negotiated. In terms of functionality, G.hs is to be similar to the well known V.8bis standard. The V.8bis standard is an established handshake protocol used for voice band services and employs an extensible tree structure which is not only efficient with respect to channel utilization but is easily expandable to support new services. These are seen as important qualities which should be incorporated into the evolving G.hs standard.

G.hs is a physical layer and messaging protocol specification used to establish a connection and negotiate a common mode of operation between two modems at either end of a subscriber line without any a priori knowledge of the capabilities of each end. However, different DSL systems operate in different frequency bands. Thus, since neither end knows what capabilities and frequency bands are supported at the other end, coordinating the G.hs transmit and receive spectrums such that they are not mutually exclusive and restrictive is difficult. This becomes an issue when a central office DSL modem must be able to adapt its transmission protocol to different subscriber modems. Indeed, any device capable of operation in different frequency bands would encounter difficulties in the initial contact with other devices if G.hs is not carefully designed. Such devices include both those that support multiple DSL standards and those that support variants, or "flavors", of a single DSL standard that have different frequency band allocations.

Accordingly, for the physical layer modem part, it is advantageous to define multiple tones in several specific frequency bands in order to account for the various DSL flavors which may be supported (i.e., G.lite in a Japanese ISDN environment requires a different frequency spectrum than G.lite or G.dmt in a European environment). One approach would be to implement G.hs transceivers such that they are capable of transmitting and receiving over many different frequency bands. However, the addition of each new frequency band increases the cost of implementation and as new frequency bands are added in the future, older G.hs equipment would become obsolete.

One proposal suggests probing each of the bands at the transmitter and receiver, either in serial or parallel, to determine a mutual spectrum. However, this approach is somewhat time consuming, relatively complex, and does not allow existing G.hs equipment to support additional frequency bands which may be introduced in the future. This approach also burdens future products with a possibly onerous backwards compatibility constraint.

The inventors have realized that a simple, expandable approach to the use and assignment of tones within frequency bands for G.hs intercommunication would be desirable. The present invention provides an architecture and particular embodiments of such a solution.

SUMMARY

The invention provides a system and method for a handshake protocol for digital subscriber line modems and similar telecommunication systems that makes beneficial use of aliasing to select signaling tones. In particular, the invention carefully selects set(s) of signaling tones ("tone sets") at frequencies such that higher frequency tones would alias down and coincide with a base tone within the set after sub-sampling (possibly after a frequency shift), where sub-sampling is defined to be sampling at a rate lower than the Nyquist sampling rate of the tones of interest. Thus, rather than filtering out higher frequencies to avoid aliasing, aliasing is exploited to use these higher frequencies. This technique would allow a receiver to detect and decode the higher frequency tones at lower frequency tone locations or bands. A related innovation is a band set, which includes one or more tones within a particular frequency band, where typically each tone in a band set corresponds to a different tone set.

Exploiting the effects of aliasing eliminates the need to search for a compatible spectrum, simplifies receiver design, provides flexibility, scalability and future-proofing, and even allows handshaking sessions to be established across mutually exclusive spectrums. The invention is particularly useful for DSL systems, and in particular is well suited for the proposed G.hs standard.

In one aspect, the invention includes a system, method, and protocol for communicating capabilities between a first telecommunication unit and a second telecommunication unit, each having a receiver, including a first tone set including at least one tone for signaling from the first telecommunication unit to the second telecommunication unit, the first tone set including a base tone such that all other tones within such first tone set alias onto the base tone when appropriately sub-sampled by the receiver within the second telecommunication unit, possibly after a frequency shift.

The details of one or more embodiments of the invention are set forth in the accompanying drawings and the description below. Other features, objects, and advantages of the invention will be apparent from the description and drawings, and from the claims.

DETAILED DESCRIPTION

Overview

Figure 1:
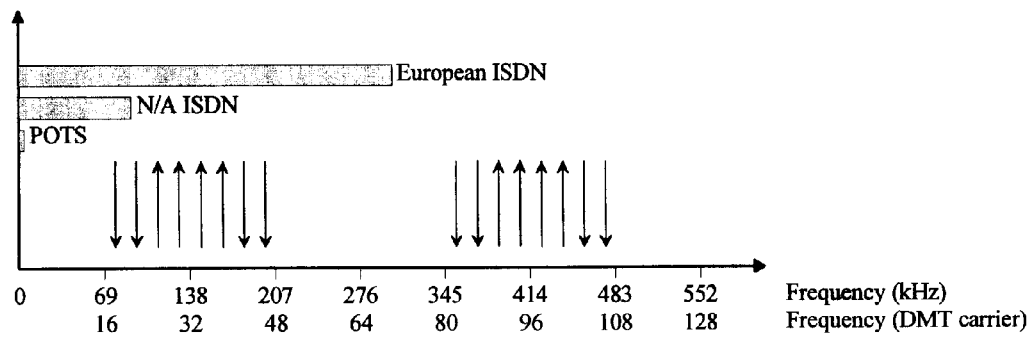
FIG. 1 is diagram of upstream and downstream handshake protocol signaling tones in accordance with the invention.

Aliasing is an effect of digital sampling. When sampling an analog signal at a rate called the sampling frequency (e.g., fs samples/second), all frequency components above a frequency fs/2 Hz (called the Nyquist sampling frequency) will be folded or reflected back down into the frequencies below fs/2 Hz. In typical communications systems, this aliasing effect is considered a negative side-effect of sampling and thus analog anti-aliasing filters are typically used to suppress those frequency components above fs/2 Hz before sampling.

However, the invention provides a system and method for a handshake protocol that makes beneficial use of aliasing to select and detect signaling tones. In particular, the invention carefully selects signaling tones at frequencies such that higher frequencies would alias down and coincide with specific lower frequencies after sub-sampling. Thus, rather than filtering out higher frequencies to avoid aliasing, aliasing is exploited to use these higher frequencies. This technique would allow a receiver to detect and decode the higher frequency tones at lower frequency tone locations.

The invention is particularly useful for DSL systems, and in particular is well suited for the proposed G.hs standard. The invention includes the following advantages:

Simple spectrum coordination: Exploiting aliasing eliminates the complexity associated with probing multiple different frequency bands to find a mutually supported band. In fact, connections may be established across mutually exclusive spectrums.

Wide application: Multiple spectrums can be selected such that at least one is spectrally compliant with each supported DSL system operating in each supported environment. Because aliasing is exploited, defining multiple spectrums adds no additional complexity.

Receiver simplicity: A low complexity receiver can be designed which decodes only the lowest frequency tones. Furthermore, the AFE (analog front end) of a modem utilizing the invention need not support the sampling rates required for higher frequency tones.

Receiver robustness: In the majority of cases, the additional energy supplied by the tones that are aliased onto the base tone will provide increased robustness by the existence of constructive interference and frequency diversity.

Scalable and future-proof: The invention provides for a scalable architecture to which future frequency bands may be added. Current implementations will be capable of establishing handshaking connections with future implementations and vice versa.

Basic Embodiment

The physical layer specification for a G.hs-type handshake protocol specifies the method by which end-to-end data transmission is achieved. This includes specification of the frequency bands, modulation technique, and signaling protocol. In the specification of the physical layer, the following must be considered:

(1) The protocol should not assume any one particular modulation format is supported across all modems for which it is negotiating. Therefore, the modulation format selected for the protocol should not be tied to one particular DSL modulation format but rather should be selected based on simplicity of implementation and reliability.

(2) The only assumption about the available spectrum is that the frequency bands associated with a particular DSL standard shall adhere to the spectral mask of that standard. Multiple frequency bands may be selected for a particular DSL standard if it is expected to be deployed in environments with other services such as to maintain spectral compatibility between multiple simultaneous services.

(3) When a modem connection is not established or is being established by means of the protocol, the receiver will search for the first protocol signal. It is desirable then that this detection process require a minimal amount of CPU resources, be robust and that the AFE operate in a low power mode with a minimal frequency range to monitor.

Thus, a handshake protocol should use a modulation scheme that is robust, easy to implement, requires a minimal amount of CPU resources, and requires a low AFE sampling rate. Furthermore, the modulation scheme should be portable across different modem platforms. If the tones are restricted to integer multiples of 4.3125 kHz, then discrete multitone modulation (DMT) such as used by G.lite and G.dmt systems can be used for G.hs signaling. However, because DMT requires timing and synchronization and not all DSL flavors support DMT, DMT is not the preferred primary modulation scheme used for G.hs. Accordingly, the invention preferably utilizes a tone-based modulation scheme as part of a handshake protocol that would be suitable for use as part of the evolving G.hs protocol. Otherwise, the characteristics of the handshake protocol above the physical layer should be based as much as possible on the V.8bis standard.

For ease of understanding, the invention is described in the context of a G.hs compatible embodiment. However, the principals of the invention may be applied to any handshaking or signaling protocol that operates in an environment similar to a DSL system (including wireless communication systems) or has requirements similar to G.hs.

Tone-based Modulation. Although the preferred embodiment for the physical layer of a G.hs compatible handshaking protocol is loosely based on concepts embodied in the V.8bis standard, there is no reason to select the V.8bis frequency shift keying (FSK) scheme as the modulation scheme for a G.hs-type system (after all, G.hs and V.8bis are not required to interoperate at the physical layer and none of the modems currently proposed to use G.hs support FSK). One embodiment of the invention suitable for use as part of the evolving G.hs protocol uses a tone-based differential binary phase shift keying (DPSK) modulation scheme for the physical communication layer. DPSK modulation is relatively easy to implement, has good error performance in noisy environments, and is portable across modem platforms. A binary one is represented by a 180° phase change, while a binary zero is represented by no phase change. Differential encoding implies that phase tracking is not required at the receiver. Furthermore, timing tracking is not required at the receiver if the period of the DPSK symbol is long enough to account for an acceptable timing drift during the session. It is anticipated that the maximum duration of a G.hs session should not exceed 2 seconds. Although the DPSK symbol length can be designed to take advantage of processes commonly found in the DMT-based G.dmt and G.lite modems, this would not make the DPSK modulation technique any more difficult to implement in non-DMT modems.

In the preferred embodiment, the raw DPSK bit rate is set to 4312.5/8 bit/second. The invention does not depend on this data rate but a data rate that eliminates the need for timing tracking in the receiver is most useful. This particular data rate is faster than V.8bis and yet is very simple to modulate and demodulate and provides the desired data reliability. Also, this data rate is related to the raw DMT symbol rate for G.dmt and G.lite if the cyclic extension were disabled and ensures that, for common G.dmt and G.lite sampling rates (i.e., 276, 552, 1102 or 2208 ksample/second), each of the constituent tones in the DPSK symbol consists of an integer number of cycles. This rate thus allows for a simple table look-up approach to modulation where the samples from the table are passed directly to the AFE for a binary zero and are inverted and then passed to the AFE for a binary one. For example, given a 276 ksample/second sampling rate, a single length 64 look-up table can be used. This look-up table can be easily generated off-line and stored in memory, and thus does not require real-time generation.

Tone Selection. Tone selection should allow the exploitation of a controlled aliasing effect. This allows the remote terminal unit receiver to operate with a sampling rate lower than the Nyquist sampling rate of the tones being detected. If the tones are selected such that there is a sub-sampling rate, possibly after a frequency shift, which allows all the tones to fold onto a base set of tones, then the receiver design is greatly simplified. This method of tone selection also ensures future-proofing of the receiver design.

In the preferred embodiment, the invention uses two groups of tone sets for signaling, one for the downstream direction (the direction of transmission from a central site terminal unit) and one for the upstream direction (the direction of transmission from a remote terminal unit). To avoid possible nulls in the frequency domain (i.e., narrow frequency bands in which the signal is significantly more attenuated than elsewhere), it is preferred that multiple tones be used and modulated identically. The use of multiple tones will also minimize the effects of possible destructive interference between aliased tones due to clock errors and channel phase distortion.

To allow for compatibility with existing DSL implementations, the tones for a G.hs compatible protocol should correspond to DMT carriers (i.e., be integer multiples of 4.3125 kHz). Further, to simplify the description in the context of a DSL handshake protocol, these tones are referenced by their corresponding DSL system DMT carrier numbers (i.e., tone 20 corresponds to 20×4.3125 kHz=86.25 kHz). However, the invention does not depend on this frequency spacing. Any frequency spacing can be used and a similar numbering of tones can be employed. The invention will be most useful if the sampling rate considered is also a multiple of the tone spacing.

A specific embodiment of such a tone selection is given here. For compatibility with present North American DSL systems, the upstream tones are selected from the set of tones 20 through 31 in this embodiment. These tones are above the North American ISDN band while not exceeding the proposed upstream bandwidths of G.dmt and G.lite. Preferably both tone 21 (90.5625 kHz) and tone 31 (133.6875 kHz) are used simultaneously. These tones are selected for the following reasons: (1) selecting tones at either end of the available set of tones helps to ensure that if one tone falls within a null in the frequency spectrum, the probability of the other tone suffering the same fate is substantially reduced; and (2) this selection allows a downstream tone to be positioned at tone 26, which is equally distant from tones 21 and 31 to ensure maximum separation to help echo canceling and/or filtering.

In this embodiment, the downstream tones are selected from the set of all tones greater than or equal to 20. From these tones, a subset of acceptable downstream tones is defined such that, if sub-sampling is employed at the receiver, the tones above tone 32 are aliased on top of the tones below tone 32. The inventors have identified the subset of all tones which, when sampled at 276 kHz (the minimum required sampling rate for tones 31 and lower), will all alias onto the same base tone within the set of tones 20 through 31 (i.e., between 86.25 kHz and 133.6875 kHz). (The subset of tones could have been selected such that they all aliased onto a base tone below tone 20; however, such a selection would have made detection of the aliased tones more difficult if other services were using the spectrum below tone 20.) The set of tones is defined as:

$$C_{ds}=(32\times m)\pm n, \text{ for } m=1,3,5,\ldots,(N/32) \text{ and } 0<n<12$$

where N=the number of downstream carrier tones supported at the transmitter (N should be an integer power of 2 greater than 32).

For a sampling rate of 276 kHz, all tones alias onto the (32-n)-th carrier. Selecting n=6 means that all tones alias onto the $26^{th}$ tone, which is half way between the upstream carriers. For example, if the downstream channel supports N=128 carriers, the set of downstream tones is {26, 38, 90, 102}. If the receiver uses a 276 kHz sampling rate, these tones would all fall onto the $26^{th}$ tone. If the receiver uses a 552 kHz sampling rate, these tones would fall onto tones 26 and 38. (At a sampling rate of 138 kHz or even 69 kHz, these tones still alias onto a single tone below tone 20. However, sensitivity to timing errors increases and, if there is any energy in the lower frequencies due to other services, it may be difficult to detect the aliased tones.) In this embodiment, for the downstream direction, the transmitter can select any tones from the set of all tones which would alias onto tone 26 when using a 276 kHz sampling rate.

Transmitting two downstream tones would require the central site terminal (e.g., an ATU-C) to have a 552 kHz sampling rate; transmitting four tones would require a sampling rate of 1.104 MHz. For robustness, it is preferred that a central site terminal transmitter supports four downstream tones for a G.hs compatible implementation. This ensures that even if analog high pass filtering is employed at the remote terminal unit (e.g., an ATU-R) to separate the upstream and downstream paths (i.e., frequency division multiplexing, or FDM), then the two higher frequency tones will remain after filtering for aliasing down to the target signaling tone.

Advantages of the selection of downstream tones in this embodiment include the following:

(1) By exploiting a controlled aliasing effect, the remote terminal unit receiver can operate with a sampling rate of 276 kHz or some fraction thereof. The maximum sampling rate required at the remote terminal unit is 276 kHz for both transmitting and receiving (when not transmitting, an even lower sampling rate is possible).

(2) The maximum sampling rate required for the central site terminal is also 276 kHz when receiving (only when transmitting will the central site terminal require a higher sampling rate).

(3) The central site terminal transmitter is free to select any set of tones from an infinite set of downstream tones. This provides an easy migration path for future modem technologies.

(4) This selection of tones is compatible with both frequency division multiplexing (FDM) and echo canceled (EC) systems. Even if an analog high pass filter is used to attenuate tones below 32, the higher tones will still alias onto tone 26.

Enhanced Embodiment

The basic G.hs compatible embodiment described above is suitable for use in combination with North American DSL systems. However, the specific tones identified above may not be fully compatible with European ISDN frequency bands. That is, in order to be able to share the same physical channel as conventional voice band telephony (POTS) systems and the various versions of ISDN, the selection of tones must be outside the POTS and ISDN bands. Further, the tones should be selected such that G.lite and G.dmt modems, which use only the lower 32 tones for signaling in the upstream direction, do not require an AFE which must support higher sampling rates simply to inter-operate with G.hs.

Accordingly, an enhanced embodiment of the invention addresses these issues by using two groups of tone sets for each of the upstream and the downstream signaling directions (i.e., a total of four tone sets). The base frequencies of these tone sets should still fall below 138 kHz (tone 32) so that they can be generated and detected using a 276 kHz sampling rate. Accordingly, the tone set that corresponds to each base frequency includes all frequencies above the base frequency which alias to the base frequency when a 276 kHz sampling rate is used, possibly after a frequency shift. Depending upon the other services which coexist on the channel (i.e., North American or European ISDN), an appropriate operational set of tones can be selected. This enhancement adds robustness to the embodiments of the invention. For example, this approach is less likely to fail if one of the base tones coincides with a spectral null.

The set of tones that meet these criteria are defined as follows:

$C_{us}=(32 \times m) \pm n + f_{us}$, for $m=1,3,5,\ldots$ and $n=2$ and $6$ $C_{ds}=(32 \times m) \pm n + f_{ds}$, for $m=1,3,5,\ldots$ and $n=10$ and $14$ where $C_{us}$ is the set of all available upstream carrier tones, $C_{ds}$ is the set of all available downstream carrier tones, $f_{us}$ and $f_{ds}$ are constant frequency offsets that can be removed by a simple frequency shift in the analog domain.

In this embodiment, both $f_{us}$ and $f_{ds}$ are 0 Hz. Within the upstream set, two subsets are defined: n=2 and n=6. Similarly, two downstream subsets are defined: n=10 and n=14. These subsets have the property that for a 276 kHz sampling rate, all tones above 32 alias on top of the lowest tone in the subset (i.e., tone 32−n). Table 1 lists the first four tones in each subset; the base tone onto which all other tones in the subset alias is identified with an asterisk.

TABLE 1

| Downstream Tones | | Upstream Tones | |
|---|---|---|---|
| n = 14 | n = 10 | n = 6 | n = 2 |
| 18* | 22* | 26* | 30* |
| 46 | 42 | 38 | 34 |
| 82 | 86 | 90 | 94 |
| 110 | 106 | 102 | 98 |

FIG. 1 is a diagram of upstream and downstream handshake protocol signaling tones in accordance with the enhanced embodiment of the invention. FIG. 1 illustrates these sets of tones for m=1 and m=3 (currently there does not seem to be a need to utilize tones for which m>3). Up arrows indicate tones available for upstream signaling, while down arrows indicate tones available for downstream signaling. The North American and European ISDN spectra and the POTS band are also identified.

In the absence of ISDN services, a modem using the invention may select any signaling tones from the set of all tones. When operating above North American ISDN and in conformance with G.hs, the downstream signaling tones are restricted to tones 42 and 46 or higher while all the upstream tones are available. When operating above European ISDN and in conformance with G.hs, both the downstream and the upstream signaling tones are restricted to those above 80.

In this embodiment, when selecting tones, a minimum of two upstream and two downstream tones are used. These tones are to be transmitted simultaneously and must be identically modulated. This frequency diversity ensures protection against frequency nulls in the channel spectrum and narrow band interference. Furthermore, at least one tone should be selected from each subset. The use of multiple tones from the same subset is optional. Allowing multiple tones increases the degree of frequency diversity and, in general, increases the received signal strength.

Selecting Band Sets

Criteria for tone selection have been presented and specific embodiments have been used for illustration. Now we turn to the interoperability of devices operating in different frequency bands by using the concept of "band sets". For the purpose of this discussion, a frequency band consisting of one or more tones is defined as a band set. In accordance with the invention, for each DSL system, one or more band sets is defined for each direction and must conform to the spectral mask (power spectral density, or PSD, mask) of that DSL system. We now illustrate a method by which two modems that operate in different frequency bands may communicate.

One aspect of the invention that simplifies this is the concept of a tone set introduced above. In the most general sense, a tone set consists of a single base tone and all other higher frequency tones which alias and fold on top of that base tone for a given sub-sampling rate, possibly after a frequency shift. The following generic expression defines all tone sets:

$C(K,n,j)=(K \times m) \pm n + f$, for $m=1, 3, 5, \ldots 0<n<K$, where K is the Nyquist tone associated with the lowest sub-sampling rate to be supported (for example, if the lowest sub-sampling rate were 276 KHz and the carrier spacing is 4312.5 Hz, the Nyquist tone, K, would equal (276/4.3125)/2=32; any tones in the set below 32 would not experience aliasing); m is the set of all positive odd integers and is used to generate the infinite length alias set; n is a fixed integer value between 0 and K; and f is a constant frequency offset that can be removed by a simple frequency shift in the analog domain. By selecting different values of n, separate tone sets can be generated.

Using G.dmt carriers as an example, if tone 26 is the base tone and a 276 kHz sub-sampling rate is selected, then tones 38, 90, 102, 154, 166, 218, 230, . . . (the set is infinite) will all alias to tone 26. This aspect of the invention exploits this effect such that (a) detection of G.hs-compatible signaling can be performed using only the lower frequencies, and (b) the transmitter band set and the receiver band set need not be the same. Not only does this simplify the detection process, but also eliminates the need for spectrum coordination.

Figure 2:
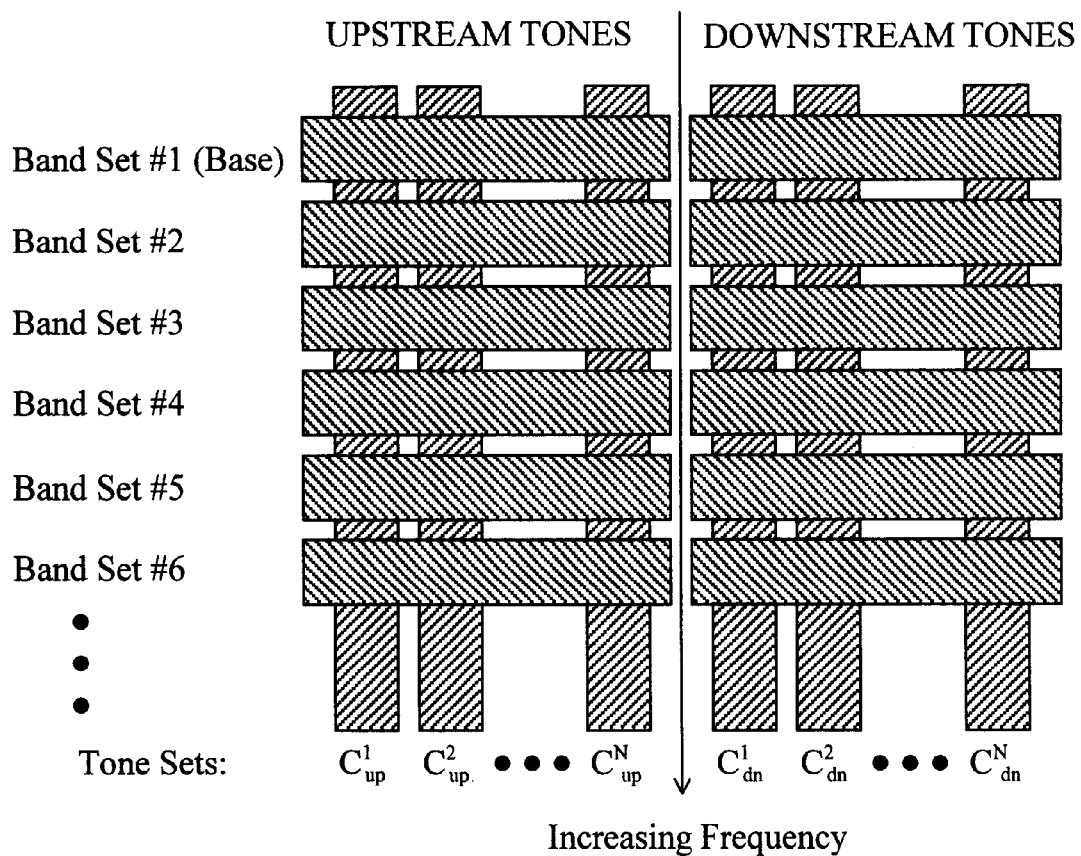
FIG. 2 is a diagram illustrating the construction of a grid of band sets from tone sets.

FIG. 2 is a diagram illustrating the construction of a grid of band sets from tone sets. In this figure, the vertical boxes illustrate tone sets and the horizontal boxes illustrate band sets. Thus, if N tones are to be supported per upstream and downstream band set (i.e., for frequency diversity), then N infinitely long tone sets would be defined. In selecting these tone sets, the same sub-sampling rate would be used. Each band set would consist of one tone from each of the tone sets. Thus, band set #1 would use the first tone in each tone set, band set #2 would use the second tone in each tone set, and so forth. As a result, all band sets above band set #1 will alias on top of band set #1 (the base band set) given the same sub-sampling rate as used to select the tone sets.

Given this infinite set of band sets, the selection of signaling tones may begin. In selecting suitable tone sets for a G.hs-compatible handshaking protocol to be used with particular DSL systems, the following issues must be considered: (1) the handshaking. protocol should be capable of simultaneously operating in the presence of POTS and ISDN services; (2) the handshaking protocol should not use the activation signals defined for the T1.413 standard; (3) the tone selection within a tone set should be such as to avoid possible intermodulation distortion. (i.e., the sum or differences of the upstream tones should not be equal to a downstream tone). Thus, for each DSL system supported by a handshaking protocol in conformance with the invention, one or more band sets are selected (note: this is not a dynamic selection but rather band sets are selected and specified once for each system).

Using the framework presented above, two modems that operate in different frequency bands may communicate by selecting tones for transmission from within band sets that are covered by their own spectral capabilities and then communicating by receiving the other modem's transmission on the appropriate base set.

Figure 3:
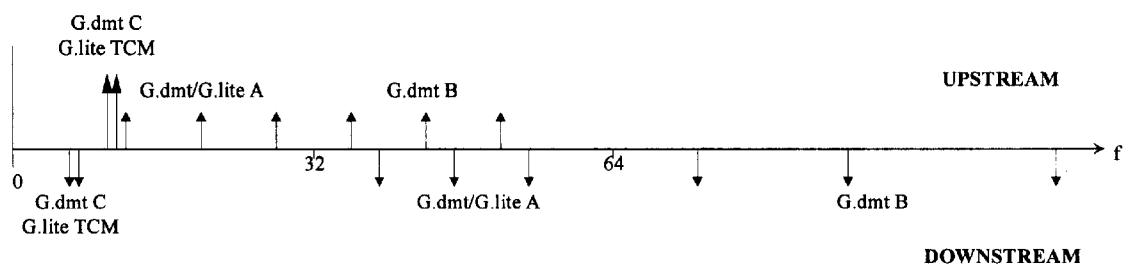
FIG. 3 is a diagram of preferred signaling tones for a G.hs-compatible handshaking protocol in accordance with the invention.

Table 2 and FIG. 3 identify preferred signaling tones for a G.hs-compatible handshaking protocol in accordance with the invention. Note that G.dmt A and G.dmt B operate in mutually exclusive spectrums but that they can still communicate. The following criteria were used in the selection of tones given in Table 2:

(1) Compatibility with existing T1.413 systems: The tones selected avoid all T1.413 activation tones except tones 44 (C-ACT2 signal) and 52 (C-ACT3 signal). Since tones 44 and 52 are G.dmt B upstream tones and C-ACT2 and C-ACT3 are downstream tones, confusion between G.hs and T1.413 initiation will not occur.

(2) No intermodulation distortion: The tones have been selected such that false detection due to intermodulation distortion products in a splitterless DSL environment will not be problematic. The upstream tones are selected from a band set/tone set grid of 8N+4 and the downstream tones are selected from both band set/tone set grids of 8N+1 and 8N−1.

(3) Allows for exploitation of aliasing: With a sampling rate of 276 kHz, the G.dmt B upstream tones alias over the G.dmt A upstream tones and the G.dmt A and G.dmt B downstream tones alias to the lower frequency tones 38.8125 kHz, 73.3125 kHz, and 107.8125 kHz (tones 9,17, 25, respectively).

(4) Reduced noise via comb filtering: By placing the upstream tones on an 8N+4 grid, a comb filter may be used at both the central site terminal and the remote terminal unit to detect and demodulate the handshake signaling tones and to suppress noise due to echoes and crosstalk.

(5) Increased tone spacing at higher frequencies: In order to assist bandpass filter approaches to G.hs demodulation, the tone spacing increases with increasing frequency. In the preferred embodiment, the minimum spacing between tones is 117% (i.e., tone 55 divided by tone 47 is equal to 117%).

TABLE 2

G.hs compatible tones for the 4.3125 kHz signaling family

| Signaling Band | Upstream Tones, kHz (tone #) | Downstream Tones, kHz (tone #) |
|---|---|---|
| G.dmt A | 51.7500 (12) | 168.1875 (39) |
|  | 86.2500 (20) | 202.6875 (47) |
|  | 120.7500 (28) | 237.1875 (55) |
| G.dmt B | 155.2500 (36) | 314.8125 (73) |
|  | 189.7500 (44) | 383.8125 (89) |
|  | 224.2500 (52) | 478.6875 (111) |
| G.dmt C | 43.1250(10) | 25.8750 (6) |
|  | 47.4375 (11) | 30.1875 (7) |
| G.lite A | 51.7500 (12) | 168.1875 (39) |
|  | 86.2500 (20) | 202.6875 (47) |
|  | 120.7500 (28) | 237.1875 (55) |
| G.lite TCM | 43.1250 (10) | 25.8750 (6) |
|  | 47.4375 (11) | 30.1875 (7) |

A method in accordance with the invention includes at least the following steps:

(1) Defining a first tone set including at least one tone for signaling from a first telecommunication unit to a second telecommunication unit, the first tone set including a base tone such that all other tones within such first tone set alias onto the base tone when appropriately sub-sampled by the receiver within the second telecommunication unit, possibly after a frequency shift.

(2) When receiving signal tones in the second telecommunication unit from the first telecommunication unit, sampling the signal tones at a frequency sufficient to down convert or alias the signals to the base tone of the first tone set.

(3) Optionally, defining a second tone set including at least one tone for signaling from the second telecommunication unit to the first telecommunication unit, the second tone set including a base tone such that all other tones within such second tone set alias onto the base tone when appropriately sub-sampled by the receiver within the first telecommunication unit, possibly after a frequency shift.

(4) If step 3 is performed: When receiving signal tones in the first telecommunication unit from the second telecommunication unit, sampling the signal tones at a frequency sufficient to down convert or alias the signals to the base tone of the second tone set.

Optionally, multiple tone sets may be used in one or both directions for redundancy.

A number of embodiments of the present invention have been described. Nevertheless, it will be understood that various modifications may be made without departing from the spirit and scope of the invention. Accordingly, other embodiments are within the scope of the following claims.

What is claimed is:

1. A system for communicating capabilities between a first telecommunication unit and a second telecommunication unit, the system comprising:

a transmitter in the first telecommunication unit that generates a first tone set for signaling the second telecommunication unit, the first tone set including a set of tones that alias onto a first base tone when sub-sampled; the first tone set defined as:

$$C_{ds}=(32 \times m) \pm n, \text{ for } m=1,3,5,\ldots,(N/32) \text{ and } 0<n<12$$

where N=the number of downstream carrier tones supported at the first telecommunication unit, and N is an integer power of 2 greater than 32; and a receiver in the second telecommunication unit that samples the first tone set transmitted by the first telecommunication unit, the receiver sampling the first tone set at a rate below the Nyquist sampling frequency of the lowest frequency tone in the first tone set that is above the frequency of the first base tone;

wherein sampling the first tone set causes tones in the first tone set that are above the first base tone to alias onto the base tone.

2. A system for communication capabilities between a first telecommunication unit and a second telecommunication unit, the system comprising:

a transmitter in the first telecommunication unit that generates a first tone set for signaling the second telecommunication unit, the first tone set including a set of tones that alias onto a first base tone when sub-sampled wherein the first tone set, $C_{ds}$, is defined as:

$$C_{ds}=(32 \times m) \pm n + f_{ds}, \text{ for } m=1,3,5,\ldots, \text{ and } n=10 \text{ and } 14$$

where $f_{us}$ is a constant frequency offsets;

a receiver in the second telecommunication unit that samples the first tone set transmitted by the first telecommunication unit, the receiver sampling the first tone set at a rate below the Nyquist sampling frequency of the lowest frequency tone in the first tone set that is above the frequency of the first base tone;

wherein sampling the first tone set causes tones in the first tone set that are above the first base tone to alias onto the base tone;

a transmitter in the second telecommunication unit that generates a second tone set for signaling the first telecommunication unit, the second tone set including a set of tones that alias onto a second base tone when sub-sampled, the second tone set, $C_{us}$ is defined as:

$$C_{us}=(32 \times m) \pm n + f_{us}, \text{ for } m=1,3,5,\ldots \text{ and } n \text{ 2 and 6}$$

where $f_{us}$ is a constant frequency offset; and a receiver in the first telecommunication unit that samples the second tone set at a rate below the Nyquist sampling frequency of the lowest frequency tone in the second tone set that is above the frequency of the second base tone;

wherein sampling the second tone set causes tones in the second tone set that are above the second base tone to alias onto the second base tone.

3. A system for communicating capabilities between a first telecommunication unit and a second telecommunication unit, the system comprising:

a transmitter in the first telecommunication unit that generates a first tone set for signaling the second telecommunication unit, the first tone set including a set of tones that alias onto a first base tone when sub-sampled; and a receiver in the second telecommunication unit that samples the first tone set transmitted by the first telecommunication unit, the receiver sampling the first tone set at a rate below the Nyquist sampling frequency of the lowest frequency tone in the first tone set that is above the frequency of the first base tone;

wherein sampling the first tone set causes tones in the first tone set that are above the first base tone to alias onto the base tone;

wherein the first tone set is defined as:

$$C(K,n,f)=(K \times m) \pm n + f, \text{ for } m=1,3,5,\ldots 0<n<K,$$

where K=a Nyquist tone associated with the lowest sub-sampling rate to be supported, and f is a constant frequency offset.

4. A system for communicating capabilities between a first telecommunication unit and a second telecommunication unit, the system comprising:

a transmitter in the first telecommunication unit that generates a first tone set for signaling the second telecommunication unit, the first tone set including a set of tones that alias onto a first base tone when sub-sampled; and a receiver in the second telecommunication unit that samples the first tone set transmitted by the first telecommunication unit, the receiver sampling the first tone set at a rate below the Nyquist sampling frequency of the lowest frequency tone in the first tone set that is above the frequency of the first base tone;

wherein sampling the first tone set causes tones in the first tone set that arc above the first base tone to alias onto the base tone;

a transmitter in the second telecommunication unit that generates a second tone set for signaling the first telecommunication unit, the second tone set including a set of tones that alias onto a second base tone when sub-sampled; and a receiver in the fist telecommunication unit that samples the second tone set at a rate below the Nyquist sampling frequency of the lowest frequency tone in the second tone set that is above the frequency of the second base tone;

wherein sampling the second tone set causes tones in the second tone set that are above the second base tone to alias onto the second base tone;

wherein the first tone set, $C_{ds}$, and the second tone set, $C_{us}$, are defined as:

$$C(K,n,f)=(K \times m) \pm n + f, \text{ for } m=1,3,5,\ldots 0<n<K,$$

where K=a Nyquist tone associated with the lowest sub-sampling rate to be supported, and f is a constant frequency offset.

5. A protocol for communicating capabilities between a first telecommunication unit and a second telecommunication unit, each unit having a receiver, the protocol including a first tone set including at least one tone for signaling from the first telecommunication unit to the second telecommunication unit, the first tone set including a base tone such that all other tones within such first tone set alias onto the base tone of the first tone set when sub-sampled by the receiver within the second telecommunication unit wherein the first tone set is defined as:

$$C_{ds}=(32 \times m) \pm n, \text{ for } m=1,3,5,\ldots,(N/32) \text{ and } 0<n\leq 2$$

where N=the number of downstream carrier tones supported at the first telecommunication unit, and N is an integer power of 2 greater than 32.

6. The protocol of claim 5, further including a second tone set including at least one tone for signaling from the second telecommunication unit to the first telecommunication unit, the second tone set including a base tone such that all other tones within such second tone set alias onto the base tone of the second tone set when sub-sampled by the receiver within the first telecommunication unit, wherein the first tone set, $C_{ds}$, and the second tone set, $C_{us}$, are defined as:

$C_{us}=(32 \times m) \pm n + f_{us}$, for $m=1,3,5,\ldots$ and $n=2$ and 6

$C_{ds}=(32 \times m) \pm n + f_{ds}$, for $m=1,3,5,\ldots$ and $n=10$ and 14 where $f_{us}$ and $f_{ds}$ are constant frequency offsets.

7. A protocol for communicating capabilities between a first telecommunication unit and a second telecommunication unit, each unit having a receiver, the protocol including a first tone set including at least one tone for signaling from the first telecommunication unit to the second telecommunication unit, the first tone set including a base tone such that all other tones within such first tone set alias onto the base tone of the first tone set when sub-sampled by the receiver within the second telecommunication unit;

wherein the first tone set is defined as:

$C(K,n,f)=(K \times m) \pm n + f$, for $m=1,3,5,\ldots$ $0<n<K$, where K=a Nyquist tone associated with the lowest sub-sampling rate to be supported, and f is a constant frequency offset.

8. The protocol of claim 5, further including a second tone set including at least one tone for signaling from the second telecommunication unit to the first telecommunication unit the second tone set including a base tone such that all other tones within such second tone set alias onto the base tone of the second tone set when sub-sampled by the receiver within the first telecommunication unit, wherein the second tone set is defined as:

$C(K,n,f)=(K \times m) \pm n + f$, for $m=1,3,5,\ldots$ $0<n<K$, where K=a Nyquist tone associated with the lowest sub-sampling rate to be supported, and f is a constant frequency offset.

9. A method for communicating capabilities between a first telecommunication unit and a second telecommunication unit, each unit having a receiver, the method including:
(a) defining a first tone set for signaling from the first telecommunication unit to the second telecommunication unit, the first tone set including a first base tone such that all other tones within the first tone set alias onto the fast base tone when sub-sampled by the receiver within the second telecommunication unit wherein the first tone set is defined as:

$C_{ds}=(32 \times m) \pm n$, for $m=1,3,5,\ldots,$ $(N/32)$ and $0<n<12$ where N=the number of downstream carrier tones supported at the first telecommunication unit, and N is an integer power of 2 greater than 32;
(b) transmitter at least one tone of the first tone set from the first telecommunication unit to the second telecommunication unit, the at least one tone of the first tone set being a tone other than the first base tone; and
(c) generating an alias frequency having the same frequency of the first base tone, the alias frequency being generated by sampling, at the receiver of the second telecommunication unit, the at least one tone of the first tone set at a sampling rate below the Nyquist sampling frequency of the at least one tone of the first tone set.

10. A method for communicating capabilities between a first telecommunication unit and a second telecommunication unit, each unit having a receiver, the method including:
(a) defining a first tone set for signaling from the first telecommunication unit to the second telecommunication unit, the first tone set including a first base tone such that all other tones within the first tone set alias onto the first base tone when sub-sampled by the receiver within the second telecommunication unit, wherein the first tone set, $C_{ds}$, is defined as:

$C_{ds}=(32 \times m) \pm n + f_{ds}$, for $m=1,3,5,\ldots$ and $n=10$ and 14 where $f_{us}$ and $f_{ds}$ is a constant frequency offset:
(b) transmitting at least one tone of the first tone set from the first telecommunication unit to the second telecommunication unit, the at least one tone of the first tone set being a tone other than the first base tone;
(c) generating an alias frequency having the same frequency of the fist base tone, the alias frequency being generated by sampling, at the receiver of the second telecommunication unit, the at least one tone of the first tone set at a sampling rate below the Nyquist sampling frequency of the at least one tone of the first tone set;
(d) defining a second tone set for signaling from the second telecommunication unit to the first telecommunication unit, the second tone set including a second base tone such that all other tones in the second tone set alias onto the second base tone when sub-sampled by the receive within the first telecommunication it wherein the second tone set, $C_{us}$, defined as:

$C_{us}=(32 \times m) \pm n + f_{us}$, for $m=1,3,5,\ldots$ and $n=2$ and 6 where $f_{us}$ is a constant frequency offset;
(e) transmitting at least one tone of the second tone set from the second telecommunication unit to the first telecommunication unit the at least one tone of the second tone set being a tone other than the second base tone; and
(f) generating an alias frequency having the same frequency of the second base tone, the alias frequency being generated by sampling, at the receiver of the first telecommunication unit, the at least one tone of the second tone set at a sampling rate below the Nyquist sampling frequency of the at least one tone of the second tone set.

11. A method for communicating capabilities between a first telecommunication unit and a second telecommunication unit, each unit having a receiver, the method including:
(a) defining a first tone set for signaling from the first telecommunication unit to the second telecommunication unit, the first tone set including a first base tone such that all other tones within the first tone set alias onto the first base tone when sub-sampled by the receiver within the second telecommunication unit, wherein the first tone set is defined as:

$C(K,n,f)=(K \times m) \pm n + f$, for $m=1,3,5,\ldots$ $0<n<K$, where K=a Nyquist tone associated with the lowest sub-sampling rate to be supported, and f is a constant frequency offset.

12. A method for communicating capabilities between a first telecommunication unit and a second telecommunication unit, each unit having a receiver, the method including:
(a) defining a first tone set for signaling from the first telecommunication unit to the second telecommunication unit, the first tone set including a first base tone such that all other tones within the first tone set alias onto the first base tone when sub-sampled by the receiver within the second telecommunication unit;

(b) transmitting at least one tone of the first tone set from the first telecommunication unit to the second telecommunication unit, the at least one tone of the first tone set being a tone other than the first base tone; and (c) generating an alias frequency having the same frequency of the first base tone, the alias frequency being generated by sampling at the receiver of the second telecommunication unit, the at least one tone of the first tone set at a sampling rate below the Nyquist sampling frequency of the at least one tone of the first tone set;

(d) defining a second tone set for signaling from the second telecommunication unit to the first telecommunication unit, the second tone set including a second base tone such that all other tones in the second tone set alias onto the second base tone when sub-sampled by the receiver within the first telecommunication unit, wherein the second tone set is defined as:

$$C(K,n,f) = (K \times m) \pm n + f, \text{ for } m=1,3,5,\ldots\ 0<n<K,$$

where K=a Nyquist tone associated with the lowest sub-sampling rate to be supported, and f is a constant frequency offset;

(e) transmitting at least one tone of the second tone set from the second telecommunication unit to the first telecommunication units the at least one tone of the second tone set being a tone other than the second base tone; and (f) generating an alias frequency having the same frequency of the second base tone the alias frequency being generated by sampling, at the receiver of the first telecommunication unit, the at least one tone of the second tone set at a sampling rate below the Nyquist sampling frequency of the at least one tone of the second tone set.

* * * * *